(12) United States Patent
Carpov et al.

(10) Patent No.: US 11,509,457 B2
(45) Date of Patent: Nov. 22, 2022

(54) METHOD FOR SECURE CLASSIFICATION USING A TRANSCRYPTION OPERATION

(71) Applicant: COMMISSARIAT A L'ENERGIE ATOMIQUE ET AUX ENERGIES ALTERNATIVES, Paris (FR)

(72) Inventors: Sergiu Carpov, Massy (FR); Renaud Sirdey, Cernay-la-Ville (FR); Oana Stan, Massy (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 393 days.

(21) Appl. No.: 16/467,851

(22) PCT Filed: Dec. 8, 2017

(86) PCT No.: PCT/FR2017/053479
§ 371 (c)(1),
(2) Date: Jun. 7, 2019

(87) PCT Pub. No.: WO2018/104686
PCT Pub. Date: Jun. 14, 2018

(65) Prior Publication Data
US 2019/0334708 A1    Oct. 31, 2019

(30) Foreign Application Priority Data

Dec. 9, 2016  (FR) .................................. 16 62244

(51) Int. Cl.
*G06F 21/00* (2013.01)
*H04L 9/32* (2006.01)
(Continued)

(52) U.S. Cl.
CPC ............ *H04L 9/0822* (2013.01); *H04L 9/008* (2013.01); *H04L 9/3093* (2013.01)

(58) Field of Classification Search
CPC ...... H04L 9/0822; H04L 9/008; H04L 9/3093
See application file for complete search history.

(56) References Cited

U.S. PATENT DOCUMENTS 8,473,740 B2 * 6/2013 Vion-Dury ................ H04L 9/14
713/167
2012/0039473 A1 * 2/2012 Gentry .................. H04L 9/0816
380/277

(Continued)

FOREIGN PATENT DOCUMENTS

WO    WO-2020070455 A1 *  4/2020  ........... G06F 12/123

OTHER PUBLICATIONS

Joon-Woo Lee; Hyungchul Kang; Yongwoo Lee; Woosuk Choi; Jieun Eom; Maxim Deryabin; Eunsang Lee; Junghyun Lee; Donghoon Yoo; Young-Sik Kim; Jong-Seon No; "Privacy-Preserving Machine Learning With Fully Homomorphic Encryption for Deep Neural Network"; Mar. 2022; Publisher: IEEE; pp. 30039-30054 (Year: 2022).*

(Continued)

*Primary Examiner* — Shewaye Gelagay
*Assistant Examiner* — Courtney D Fields
(74) *Attorney, Agent, or Firm* — Oblon, McClelland, Maier & Neustadt, L.L.P.

(57) ABSTRACT

The present invention concerns a method for secure data classification by a computer platform. A client sends to the platform data to be classified in encrypted form using a first symmetric key. Similarly, a supplier sends to the platform parameters of a classification model in encrypted form using a second symmetric key. The invention uses a homomorphic cryptosystem defined by a public key and a private key. The platform performs a first transcryption step by deciphering the data to be classified in the homomorphic domain and a second transcryption step by deciphering the model parameters in the homomorphic domain. The classification func- (Continued)

tion is then evaluated in the homomorphic domain for providing a classification result encrypted by said public key.

10 Claims, 6 Drawing Sheets

(51) Int. Cl.
  *H04L 9/08* (2006.01)
  *H04L 9/00* (2022.01)
  *H04L 9/30* (2006.01)
  *G06F 12/123* (2016.01)

(56) References Cited

U.S. PATENT DOCUMENTS

| | | | |
|---|---|---|---|
| 2012/0201378 A1* | 8/2012 | Nabeel | H04L 9/008 380/255 |
| 2012/0213359 A1* | 8/2012 | Troncoso Pastoriza | H04L 9/008 380/28 |
| 2014/0281514 A1* | 9/2014 | Erofeev | H04L 9/0891 713/165 |
| 2016/0105402 A1* | 4/2016 | Soon-Shiong | G06F 21/6245 713/164 |

OTHER PUBLICATIONS

International Search Report dated Jan. 25, 2018 in PCT/FR2017/053479 filed Dec. 8, 2017.
Preliminary French Search Report dated Aug. 31, 2017 in FR 16 62244 filed Dec. 9, 2016.
Bost, R. et al., "Machine Learning Classification over Encrypted Data," pp. 1-34.
Graepel, T. et al., "ML Confidential: Machine Learning on Encrypted Data," 15 pages.
Garay, J. et al., "Practical and Secure Solutions for Integer Comparison," Lecture Notes in Computer Science, vol. 4450, 2007, pp. 330-342.
Dowlin, N. et al., "CryptoNets: Applying Neural Networks to Encrypted Data with High Throughput and Accuracy," Feb. 24, 2016, pp. 1-12.
Oyerinde, D. O. et al., "A Homomorphic Encryption Approach to Implementing Two-Party Privacy Preserving Data Mining," International Journal of Innovative Science, Engineering & Technology, vol. 3, No. 11, Nov. 2016, pp. 246-254, XP055402108.
Murugeshwari, B. et al., "Preservation of Privacy for Multiparty Computation System with Homomorphic Encryption," International Journal of Emerging Technology and Advanced Engineering, vol. 4, No. 3, Mar. 2014, pp. 530-535, XP055402124.
Brickell, J. et al., "Privacy-Preserving Classifier Learning," Financial Cryptography and Data Security, Feb. 23, 2009, pp. 128-147, XP019125852.
Khedr, A. et al. "SHIELD: Scalable Homomorphic Implementation of Encrypted Data-Classifiers," International Association for Cryptologic Research, vol. 20160428:235300, Apr. 29, 2016, pp. 1-12, XP061020712.
U.S. Appl. No. 15/767,885, filed Apr. 12, 2018, US 2018-0300497 A1, Sergiu Carpov et al.
U.S. Appl. No. 15/756,623, filed Mar. 1, 2018, US 2018-0267981 A1, Renaud Sirdey et al.

\* cited by examiner

METHOD FOR SECURE CLASSIFICATION USING A TRANSCRYPTION OPERATION

TECHNICAL FIELD

This invention relates in general to the secure data processing field in Cloud Computing.

STATE OF PRIOR ART

Data processing is increasingly frequently being performed on external computer platforms on the "Cloud", in other words accessible through Internet. For example, a user can make use of a computer platform hosted on the Cloud for classification of some of its data.

Data classification (or data ranking or discrimination) refers to a function $f$ from X to C, called a classification model, that for all data x of X associates a class c of C. Alternatively, the classification model can be probabilistic, and in this case the function $f$, for each class c of C, gives the probability that the data x belongs to class c.

The classification model is generally constructed from a set, called the learning set, composed of pairs (x,c) of initial data and corresponding classes. For example, the set X can be composed of N-uplets of medical parameters and the set Y can be composed of a doubleton $(c,\bar{c})$ in which c is the diagnostic of a pathology and $\bar{c}$ is the absence of this pathology.

The set of learning data is often very voluminous. In practice, it is the result of collecting data from several sources, called data suppliers in the following. Users of the classification service, called clients in the following, usually only have very small calculation and/or memory resources, (this is the case particularly when these users have mobile terminals) and for this reason, cannot download all these data so as to be able to do the classification operation themselves. Clients must use a computer platform, commissioned with building the data model and classifying the data. For example, these data can be medical data, energy consumption data, financial data, etc.

However, the use of a remote computer platform raises the question about data confidentiality, in two respects. Firstly, the confidentiality of learning needs to be protected, in other words learning data collected from and approved by suppliers (for example hospitals, energy suppliers, banks, insurance companies, etc.) and classification models created from these data (particularly model parameters). In this case, supplier data and model parameters must be kept confidential to the platform and/or clients of the classification service. Furthermore, confidentiality of the classification must be protected, in other words client data that will be used in the classification operation, and the results of this classification. For example, it could relate to medical antecedents, energy consumption of the client for a person or the financial state or the clientele portfolio for an enterprise.

Several recent publications have been made describing secure data classification (privacy-preserving classification) methods, in other words classification methods preserving data confidentiality.

The paper by R. Bost et al. entitled "Machine learning classification over encrypted data" published in Cryptology Eprint Archive, Report 1014/331, 2014, discloses in particular a secure classification method based on different possible algorithms (classification by hyperplanes, naïve Bayes classification, classification by private decision trees) that can be made on unencrypted data or on encrypted data. Classification on encrypted data makes use of cryptosystems such as the cryptosystem with quadratic residuosity by Goldwasser Micali, the Pallier cryptosystem and a cryptosystem with fully homomorphic encryption (FHE). However, this secure classification method requires the exchange of many messages between the parties and therefore leads to a relatively long execution time.

The paper by T. Graepel et al. entitled "ML confidential: machine learning on encrypted data" published in Cryptology Eprint Archive, Report 2012/323, 2012, describes an automatic learning method in which learning and classification phases take place on data encrypted by a Levelled Homomorphic Encryption (LHE). Different classification algorithms are envisaged such as classification by hyperplane or LM (Linear Means) and classification by Fisher linear discriminant. Homomorphic data encryption is not well adapted to terminals with few resources since messages containing encrypted data are large and execution times are particularly long.

Consequently, the underlying problem of the invention is to disclose a secure data classification method that does not have the disadvantages of prior art, particular that does not require sending a large number of messages or even sending long messages to the platform and consequently that can be result in a significantly shorter execution time than is possible in prior art.

PRESENTATION OF THE INVENTION

This invention is defined by a method of secure data classification on a computer platform, comprising:
- a step in which data to be classified is sent from at least one client to said computer platform, the data being sent in encrypted form using a stream cipher method using a first symmetric key associated with the client;
- a step to send parameters of a classification model from at least one supplier to said computer platform, the parameters being sent in encrypted form using a stream cipher method using a second symmetric key associated with the supplier;
- a first transcryption step in which data encrypted by the first symmetric key are reencrypted by the public key of a homomorphic cryptosystem, the data thus reencrypted being decrypted in the homomorphic domain by using the first symmetric key encrypted by the public key of the homomorphic system, to obtain said data encrypted by said public key;
- a second transcryption step in which parameters encrypted by the second symmetric key are reencrypted by said public key and are then decrypted in the homomorphic domain by using the second symmetric key encrypted by the public key of the homomorphic system, to obtain said parameters encrypted by said public key;
- a data classification step using a classification function, said classification function operating on data and parameters encrypted by the public key, said classification function being evaluated in the homomorphic domain to obtain a classification result encrypted by said public key.

In a first embodiment, prior to the first transcryption step, the first symmetric key is encrypted by the client using the public key and is then transmitted thus encrypted to the computer platform, the first transcryption step decrypting the reencrypted data in the homomorphic domain using the first symmetric key encrypted by the public key.

Prior to the first transcryption step, the public key is transmitted by the client to the computer platform and the computer platform transmits the classification result encrypted by said public key to the client, the client decrypting this result using the private key of said homomorphic cryptosystem to obtain a plaintext classification result.

In this case, the public key is preferably transmitted by the computer platform to the supplier, and prior to the second transcryption step, the second symmetric key is encrypted by the supplier using said public key and is then transmitted thus encrypted to the computer platform, the second transcryption step decrypting the reencrypted parameters in the homomorphic domain using the second symmetric key encrypted by the public key.

According to a second embodiment, prior to the first transcryption step, the public key is transmitted by the supplier to the computer platform and the computer platform transmits the classification result encrypted by said public key to the supplier, the supplier decrypting this result using the private key of said homomorphic cryptosystem to obtain an unencrypted classification result.

In this case, the public key is preferably transmitted by the computer platform to the client, and prior to the first transcryption step, the first symmetric key is encrypted by the client using said public key and is then sent thus encrypted to the computer platform, the first transcryption step decrypting the reencrypted data in the homomorphic domain using the first symmetric key encrypted by the public key.

According to a first classification model, the classification function is a linear function of data to be classified.

According to a second example classification model, the classification function is a polynomial function of data to be classified.

BRIEF DESCRIPTION OF THE DRAWINGS

Other characteristics and advantages of the invention will become clear after reading a preferred embodiment of the invention, given with reference to the appended figures among which.

DETAILED PRESENTATION OF PARTICULAR EMBODIMENTS

The basic concept of the invention is to transmit data to be classified and parameters of the classification model to the platform, after encrypting them using a symmetric key encryption, then transcrypting these data and parameters in a homomorphic domain and then finally evaluating the classification function in the homomorphic domain, the result of the classification being provided in encrypted form by the public key of the homomorphic cryptosystem. Thus, there is no need for a homomorphic encryption of data to be classified at clients and of parameters of the classification model at suppliers. Furthermore, since the entire evaluation process is carried out by the computer platform in the homomorphic domain, the computer platform cannot access the plaintext data, nor the plaintext parameters of the classification model, nor the plaintext classification result.

The secure classification method uses a homomorphic cryptosystem for the transcryption and evaluation steps of the classification function.

Homomorphic encryption can be used to perform operations (in practice arithmetic addition or multiplication operations) on data without ever exposing these data. More precisely, a homomorphic encryption is an asymmetric key $Enc_{pk}$ (public key pk) encryption in which the following property is satisfied:

$$Enc_{pk}\Omega \to \Gamma$$

$$Dec_{sk}[Enc_{pk}(a) \oplus Enc_{pk}(b)] = a+b \quad (1)$$

in which $\Omega$ is the unencrypted messages space (more simply called the plaintext space) and $\Gamma$ is the encrypted messages space (more simply called the ciphertext space), + is an additive operation in the plaintext space conferring a group structure on $\Omega$, and $\oplus$ is an operation in the ciphertext messages space conferring a group structure on $\Gamma$. It is thus understood that the application of $(\Omega,+)$ in $(\Gamma, \oplus)$ is a homomorphism of groups. $Dec_{sk}$ is the decryption function corresponding to $Enc_{pk}$ (in which sk is the user's secret key).

It follows from expression (1) that it is possible to perform an additive operation between two plaintexts (a,b) from a corresponding operation between their ciphertexts ($Enc_{pk}(a), Enc_{pk}(b)$).

More generally, a homomorphic encryption can be considered to be a ring morphism between the plaintext space (including +,× operations) and the ciphertext space (including the corresponding $\oplus$, $\otimes$ operations). We then have the following properties:

$$Dec_{sk}(Enc_{pk}(a+b)) = Dec_{sk}(Enc_{pk}(a) \oplus Enc_{pk}(b)) = a+b \quad (2\text{-}1)$$

$$Dec_{sk}(Enc_{pk}(a \times b)) = Dec_{sk}(Enc_{pk}(a) \otimes Enc_{pk}(b)) = a \times b \quad (2\text{-}2)$$

Therefore, using operations (2-1) and (2-2), it is possible to evaluate an arbitrary function $f$, that can be broken down into elementary addition and multiplication operations, in the ciphertext space and then decrypt the result.

In existing homomorphic cryptosystems, encryption consists of masking a message with noise. Conversely, decryption consists of removing this noise, that is possible if the private key of the cryptosystem is known but on the other hand is extremely difficult if it is not known. Homomorphic operations keep this masking naturally, or even amplify it. If the above-mentioned function $f$ is represented by a tree structure breakdown, each node in the tree corresponding to an elementary arithmetic operation, noise is added at each level of the tree. Thus, it is understandable that if the calculation depth of the function $f$ is high (in other words there is a large number of levels in the tree structure representation), the noise level in the evaluation result of function $f$ increases. When noise exceeds a threshold (that depends on the encryption scheme used), there is no longer a guarantee that the result can still be decrypted. When a homomorphic cryptosystem can be used to perform any calculation depth, it is said to be a Fully Homomorphic Encryption (FHE). Otherwise, it is called a Somewhat Homomorphic Encryption (SHE) or even Levelled Homomorphic Encryption (LHE)). In the following, we will assume that the homomorphic cryptosystem used is fully homomorphic or is homomorphic to a sufficient depth to evaluate the classification function. The private key and the public key of a homomorphic cryptosystem will be conventionally denoted sk-HE and pk-HE.

Transcryption is a cryptographic technique for passing from data encrypted by a first cryptosystem to the same data encrypted by a second cryptosystem, without passing through an intermediate decryption step in the plaintext space.

This secure classification method makes use of a transcryption to pass from a stream cipher encryption to a homomorphic encryption. Note that a stream cipher is a symmetric key encryption in which the message to be encrypted is simply added bit by bit with the key, in this case denoted simply sk. Decryption is made like encryption by simple bit by bit addition of the encrypted data with the symmetric key.

If x denotes data in plaintext, $[x]_{sk}$ denotes the data encrypted by stream cipher, S, and $[x]_{pk-HE}$ denotes the same data encrypted by homomorphic encryption, HE, we have the following relation:

$$S^{-1}([[x]_{sk}]_{pk-HE},[sk]_{pk-HE})=[x]_{pk-HE} \quad (3)$$

In other words, data encrypted a first time by stream cipher encryption and a second time by homomorphic encryption can be decrypted in the homomorphic domain (in other words in the homomorphic encryptions domain). Since stream cipher decryption, $S^{-1}$ is done by simple addition with the symmetric key, it can be understood that this decryption can be done in the homomorphic domain using the encrypted symmetric key $[sk]_{pk-HE}$.

In the following, we will consider a set of clients of a classification service, a remote computer platform and a set of classification model suppliers as defined above. The set of clients is denoted $U_1, \ldots U_N$ and the set of suppliers is denoted $F_1, \ldots, F_M$, in which $N \geq 1$ and $M \geq 1$.

Figure 1:
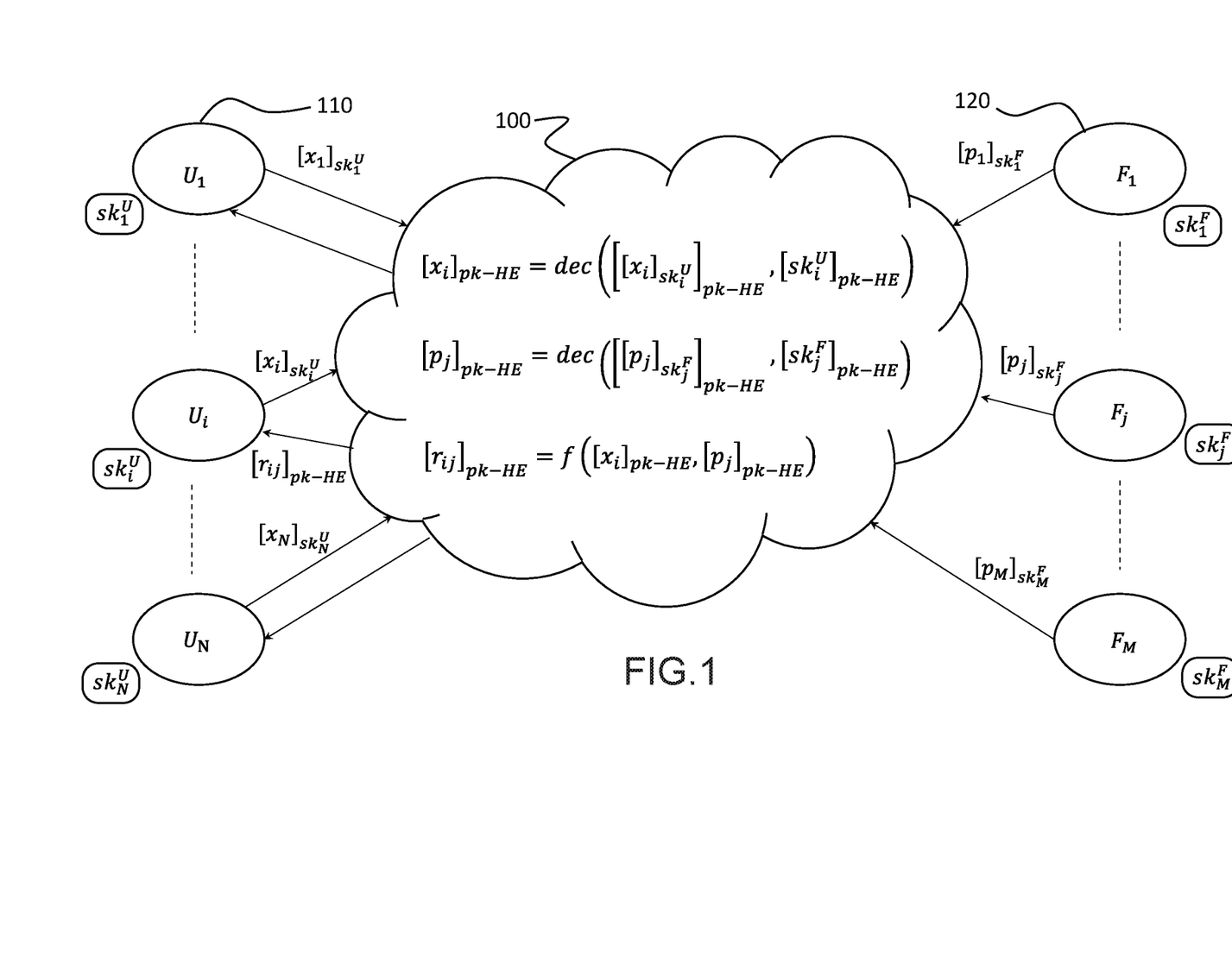
FIG. 1 diagrammatically represents a secure classification method using the general principle of the invention.

FIG. 1 diagrammatically represents a secure classification method using the general principle of the invention.

The computer platform is represented as 100, clients of the classification service are represented as 110 and classification model suppliers are represented as 120.

The platform is considered to be semi-honest, in other words it is reliable in terms of calculations made but not necessarily in terms of confidentiality of data to be classified and parameters of classification models.

Each client $U_i$, i=1, ..., N has a symmetric encryption key, denoted $sk_i^U$ by means of which it is capable of performing a stream cipher encryption of data to be classified.

Similarly, each supplier $F_j$, j=1, ..., M, has a symmetric key $sk_j^F$ by means of which it is capable of stream cipher encryption of parameters of its classification model.

We will also assume that all clients, suppliers and the computer platform share the public key, pk HE of a homomorphic cryptosystem. In the general embodiment, no assumption is made about the generation or distribution of this public key, it may have been transmitted by a client or by a supplier, as we will see later. Alternatively, it may have been transmitted by a key server.

On the other hand, only the recipient of the classification who has the private key, sk-HE, corresponding to the public key of the cryptosystem, will be able to access this classification.

In a first send step, a client $U_i$ who wants to classify its data, $x_i$, transmits them in encrypted form to the computer platform. Data to be classified are generally in the form of a given size of attributes vector. Encryption is done by stream cipher using a first symmetric key $sk_i^U$, the encrypted data being denoted $$[x_i]_{sk_i^U}.$$

The first symmetric key $sk_i^U$ is shared neither with the platform nor generally with suppliers and other clients.

Similarly, in a second send step, a supplier $F_j$ transmits parameters, $p_j$, of its classification model in encrypted form to the computer platform. Encryption is done by stream cipher using a second symmetric key $sk_j^F$, associated with the supplier $F_j$ the encrypted parameters being denoted $$[p_j]_{sk_j^F}.$$

The symmetric key $sk_j^F$ is shared neither with the platform nor generally with clients and other suppliers.

It is important to note that the order of the first and second send steps is indifferent. In other words (and as is often the case), the supplier $F_j$, firstly supplies his classification model to the platform before a client sends a data classification request.

The computer platform then performs a first and a second transcryption step, the order of these two steps also being indifferent.

During a first transcryption step, the platform transforms data encrypted by the symmetric key $sk_i^U$ into these same data, encrypted by the public key pk-HE. More precisely, the computer platform encrypts the encrypted data $$[x_i]_{sk_i^U}$$

once again using the public key pk-HE, giving $$[[x_i]_{sk_i^U}]_{pk-HE}$$

and then decrypts these data thus reencrypted in the homomorphic domain, from the symmetric key $sk_i^U$, that can be expressed as follows:

$$[x_i]_{pk-HE} = dec\left([[x_i]_{sk_i^U}]_{pk-HE}, [sk_i^U]_{pk-HE}\right) \quad (4)$$

in which $dec(\gamma,\kappa)$ denotes the stream cipher decryption operation (identical to the stream cipher encryption operation) of the encrypted message $\gamma$ using the key $\kappa$. It will be understood that the decryption operation in this case is done in the homomorphic domain, without the platform having access to plaintext data, $x_i$, at any time.

Similarly, during a second transcryption step, the platform transforms parameters encrypted by the symmetric key $sk_j^F$ into these same parameters encrypted by the public key pk-HE. More precisely, the computer platform encrypts the previously encrypted parameters $$[p_j]_{sk_j^F}$$

once again using the public key pk-HE, giving $$\left[[p_j]_{sk_j^F}\right]_{pk-HE}$$

and then decrypts these data thus reencrypted in the homomorphic domain from the symmetric key $sk_j^F$, that can be expressed as follows using the same notation conventions as above:

$$[p_j]_{pk-HE} = dec\left(\left[[p_j]_{sk_j^F}\right]_{pk-HE}, [sk_j^F]_{pk-HE}\right) \quad (5)$$

It will also be understood that the decryption operation in this case is done in the homomorphic domain, without the platform having access to plaintext parameters, $p_j$, at any time.

Finally, the platform performs a classification operation from the model for which parameters were provided by $F_j$. The classification function $f$ is evaluated in the homomorphic domain as follows:

$$[r_{ij}]_{pk-HE} = f([x_i]_{pk-HE}, [p_j]_{pk-HE}) \quad (6)$$

This evaluation is possible provided that the function $f$ is a linear function or a polynomial function, of data to be classified.

An example of a linear function is a hyperplane classifier.

An example of a polynomial (quadratic) classification, is a Gaussian classifier.

In this example, it is assumed that the data are represented by attribute vectors, x with dimension Q and that for each class $C_k$, $k=1, \ldots, K$ there is an associated average vector value $\mu_k$ (vector with dimension Q) and a positive semi-defined covariance matrix $\Sigma_k$, with dimension Q×Q. Consequently, the model is defined by parameters $\mu_k$ and $\Sigma_k$ (or $\Sigma_k^{-1}$ $k=1, \ldots, K$, collectively represented by the vector y.

The classification function is then given by:

$$r = f(x, y) = \underset{k=1,\ldots,K}{\arg\min}(f(x, C_k)) \quad (7-1)$$

in which:

$$f(x, C_k) = (x-\mu_k)^T \Sigma_k^{-1}(x-\mu_k) \quad (7-2)$$

In other words, the classification function gives the class for which the distance $(x-\mu_k)^T \Sigma_k^{-1} (x-\mu_k)$ to the proxy $\mu_k$ is minimum.

Since function $f(x, C_k)$ in (7-2) only contains polynomial (quadratic) operations, this function can be evaluated in the homomorphic domain. The results $\theta(x, C_k)$ in (7-1) can also be compared in the homomorphic domain using linear parameters. The comparison of the results can be evaluated by means of Boolean circuits for the ">" (greater than) operator on binary representations of encrypted data as described in the paper by J. Garay et al. entitled "Practical and secure solutions for integer comparison" published in T. Okamoto and X. Wang, editors, Public Key Cryptography—PKC 2007, volume 4450 of Lecture Notes in Computer Science, pages 330-342. Springer Berlin, Heidelberg, 2007.

Alternatively, a non-linear and non-polynomial function can be used (for example neural network classification) provided that such a function can be locally approximated by a polynomial function (for example Taylor series). For example, there is an example of a secure neural network classification given in the paper by N. Dowlin et al. entitled "CryptoNets: applying neural networks to encrypted data with high throughput and accuracy", available at research-.microsoft.com/apps/pubs/default.aspx?id.

In any case, the classification result is obtained in (6) in encrypted form by the public key of the homomorphic cryptosystem. It can then be decrypted by the entity (for example client or supplier) holding the corresponding secret key.

We will envisage a first embodiment below in which the classification result is transmitted to the client who made the request and a second embodiment in which this result is transmitted to the supplier whose model was used for this classification.

Figure 2:
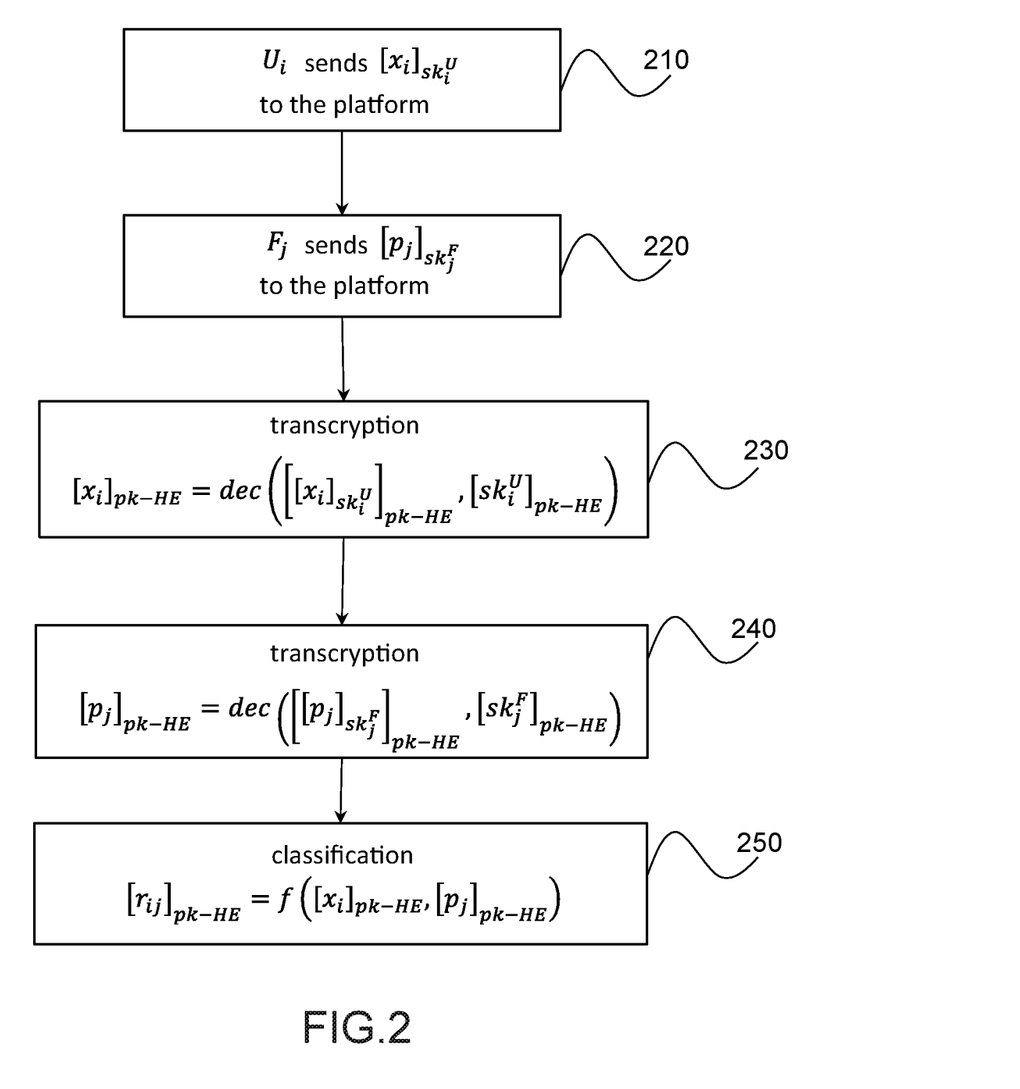
FIG. 2 represents a flow chart of the secure classification method shown in FIG. 1.

FIG. 2 represents a flow chart of the secure classification method shown in FIG. 1.

In a first send step 210, a client $U_i$ who wants to classify its data, $x_i$, transmits them in encrypted form, namely $$[x_i]_{sk_i^U},$$

to the computer platform.

In a second send step, 220, a supplier $F_j$ transmits parameters, $p_j$, of its model in encrypted form, namely $$[p_j]_{sk_j^F},$$

to the computer platform.

In a first transcryption step, 230, the computer platform encrypts the previously encrypted data $$[x_i]_{sk_i^U}$$

a second time using the public key pk-HE, namely $$\left[[x_i]_{sk_i^U}\right]_{pk-HE}$$

and then decrypts these data thus reencrypted, namely $$[x_i]_{pk-HE} = dec\left(\left[[x_i]_{sk_i^U}\right]_{pk-HE}, [sk_i^U]_{pk-HE}\right),$$

in the homomorphic domain.

In a second transcryption step, 240, the computer platform encrypts the previously encrypted parameters $$[p_j]_{sk_j^F}$$

a second time using the public key pk-HE, namely $$\left[[p_j]_{sk_j^F}\right]_{pk-HE}$$

and then decrypts these parameters thus reencrypted, namely $$[p_j]_{pk-HE} = dec\left(\left[[p_j]_{sk_j^F}\right]_{pk-HE}, [sk_j^F]_{pk-HE}\right), \quad (5)$$

in the homomorphic domain.

Finally, in a data classification step, 250, the computer platform performs a classification operation by evaluating the classification function $f$ in the homomorphic domain, namely $[r_{ij}]_{pk-HE} = \theta([x_i]_{pk-HE}, [p_j]_{pk-HE})$.

Figure 3:
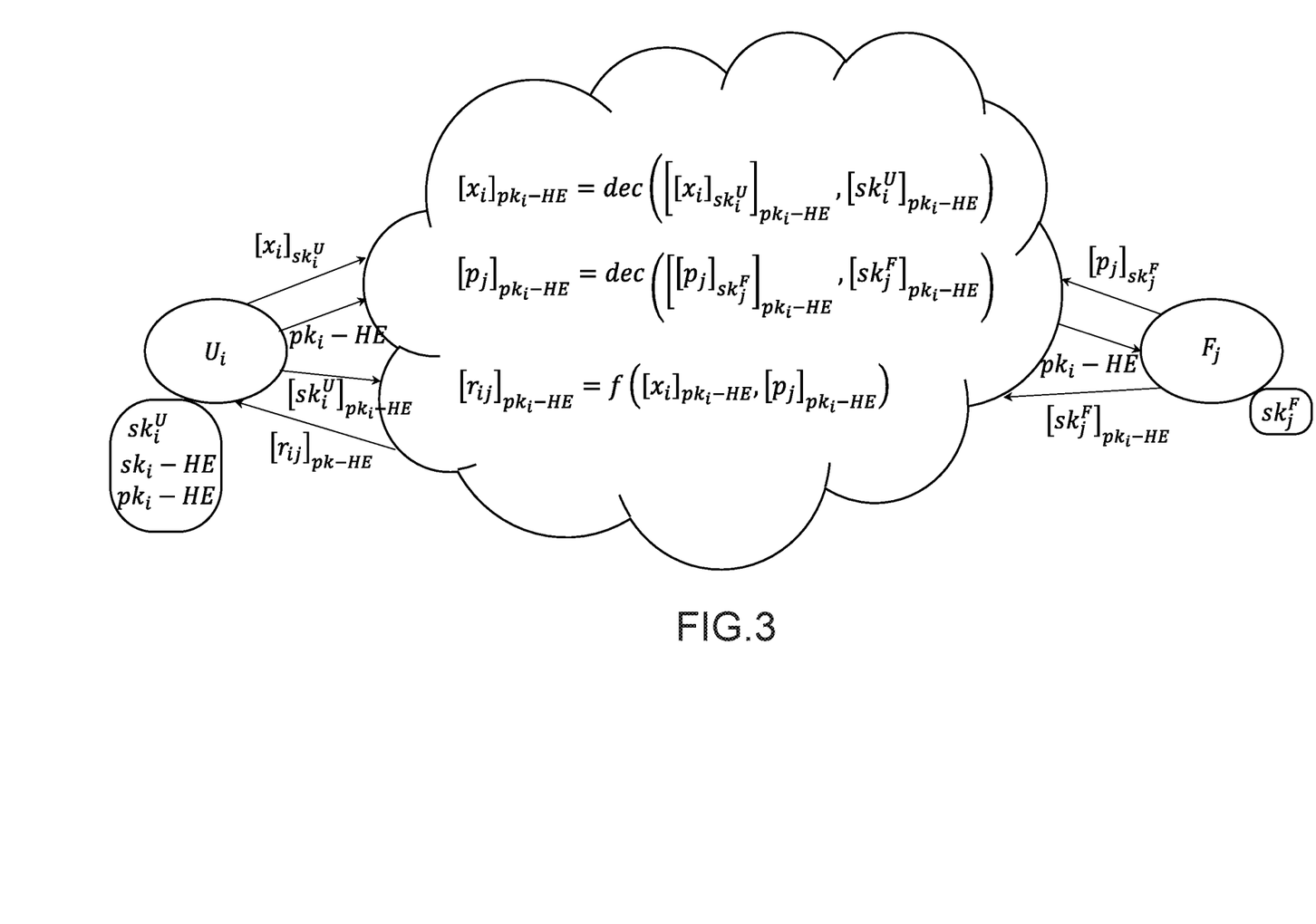
FIG. 3 diagrammatically represents a secure classification method according to a first embodiment of the invention.

FIG. 3 diagrammatically represents a secure classification method according to a first embodiment of the invention.

In this embodiment, the result of the classification is decrypted by the client who requested it. To achieve this, the client sends its homomorphic public key to the platform and decrypts the result of the classification with its corresponding private key.

In order to simplify the presentation, only the client $U_i$ and the model supplier $F_j$ concerned are represented on the figure. However, it is clear for an expert in the subject that as a general rule, several (M) suppliers can supply different classification models to the platform.

The notations $sk_i$-HE and $pk_i$-HE are used to denote a private key and a public key respectively of a homomorphic cryptosystem. For example, this pair of keys can be generated locally by the client $U_i$. The supplier may also have obtained a public key certificate from a certification authority.

In this embodiment, the client $U_i$ transmits the public key $pk_i$-HE, its data to be classified encrypted by the first symmetric key, namely $$[x_i]_{sk_i^U},$$

and the first symmetric key encrypted by the public key, namely $[sk_i^U]_{pk_i-HE}$, to the computer platform prior to the first transcryption step.

In parallel, the platform receives model parameters from the supplier $F_j$, encrypted by the second symmetric key, namely $$[p_j]_{sk_j^F}.$$

The platform transmits the public key $pk_i$-HE (received from the client $U_i$) to the supplier $F_j$. The supplier then returns the second symmetric key encrypted by the public key, namely $[sk_j^F]_{pk_i-HE}$, to the platform. This public key is transmitted to the platform before the second transcryption step.

In the first transcryption step, the computer platform once again encrypts the encrypted data $[x_i]_{sk_i^U}$, using the public key $pk_i$-HE that it received from $U_i$, and then performs the decryption operation of these reencrypted data in the homomorphic domain by means of the first symmetric key encrypted by the public key, namely $[sk_i^U]_{pk_i-HE}$, that it also received from $U_i$:

$$[x_i]_{pk_i-HE} = dec\left(\left[[x_i]_{sk_i^U}\right]_{pk_i-HE}, [sk_i^U]_{pk_i-HE}\right) \quad (8)$$

In the second transcryption step, the computer platform once again encrypts the encrypted parameters $$[p_j]_{sk_j^F},$$

using the public key $pk_i$-HE that it received from $U_i$, and then performs the decryption operation of these reencrypted data, namely $$\left[[p_j]_{sk_j^F}\right]_{pk_i-HE},$$

in the homomorphic domain by means of the second symmetric key encrypted by the public key, $$[sk_j^F]_{pk_i-HE},$$

that it previously received from $F_j$:

$$[p_j]_{pk_i-HE} = dec\left(\left[[p_j]_{sk_j^F}\right]_{pk_i-HE}, [sk_j^F]_{pk_i-HE}\right) \quad (9)$$

In the classification step, the platform evaluates the classification function as before, in other words:

$$[r_{ij}]_{pk_i-HE} = f([x_i]_{pk_i-HE}, [p_j]_{pk_i-HE}) \quad (10)$$

This classification step is then sent to the client $U_i$ that originated the request. This client then decrypts the result using his private homomorphic key $sk_i$-HE to obtain the plaintext classification $r_{ij}$. This result relates to classification of the client's data $U_i$ using the supplier's model $F_j$.

According to one variant, the pair of private and public keys of the homomorphic cryptosystem is still generated locally by the client $U_i$, but the public key is distributed by a key server, different from $U_i$, to the platform and to the supplier $F_j$, or even to all suppliers $F_j$, j=1, ..., M.

This first embodiment can be illustrated by usage cases in which hospitals (suppliers) mutualise their models for a risk of cancer of an organ on a platform, with two possible classes (benign and malignant) as the classification result. Clients are practitioners who enter medical data for their patients to confirm or deny the risk of cancer. Firstly, hospitals would like to protect the confidentiality of models sent to the platform, and secondly doctors would like to protect the confidentiality of data for their patients.

Figure 4:
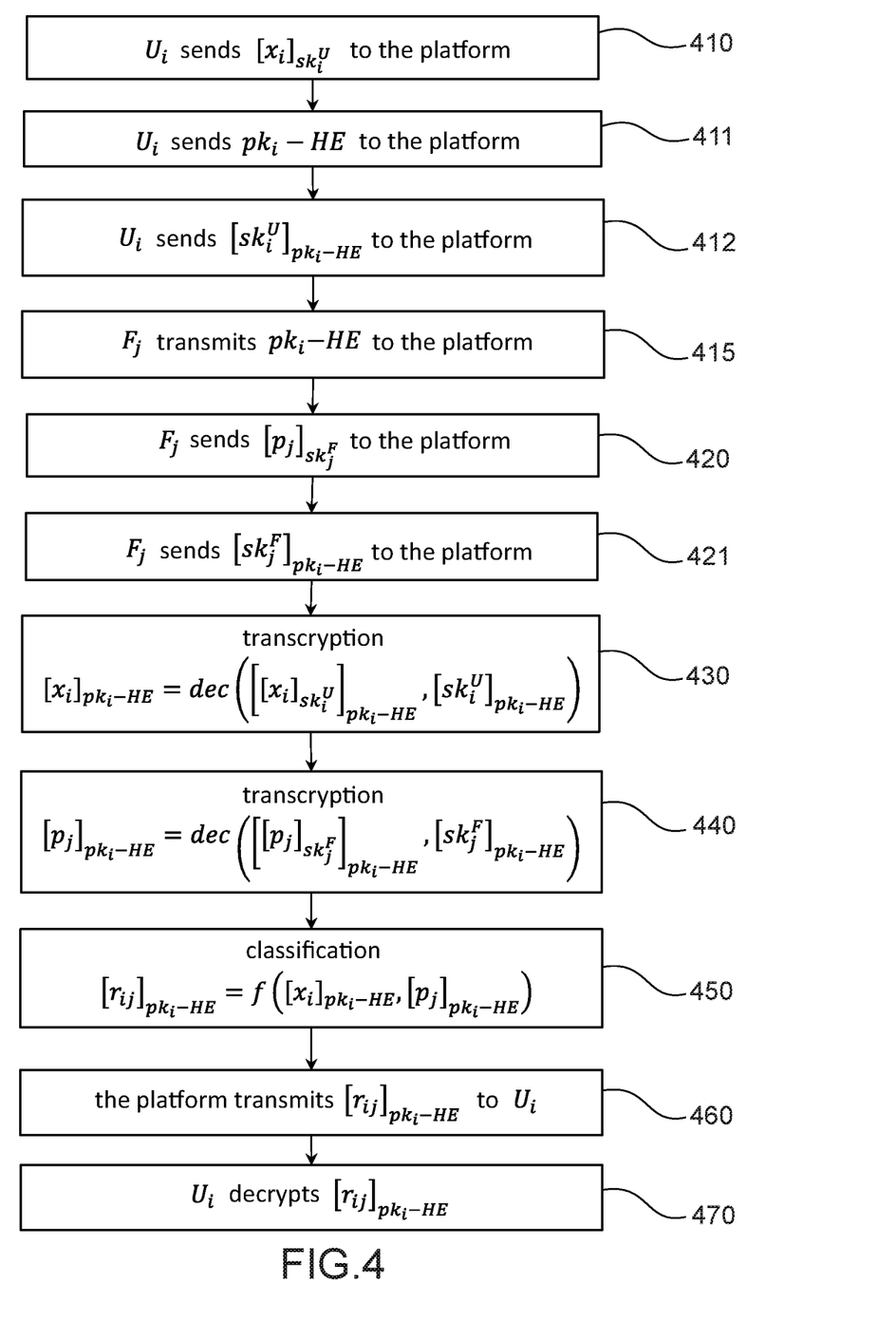
FIG. 4 represents a flow chart of the secure classification method in FIG. 3.

FIG. 4 represents a flow chart of the secure classification method shown in FIG. 3.

This method includes firstly the first send steps 410, 411, 412 from the client to the computer platform.

More precisely in 410, the client $U_i$ sends data to be classified, encrypted by its symmetric key $sk_i^U$, namely $[x_i]_{sk_i^U}$, to the platform.

In 411, the client $U_i$ sends the public key $pk_i$-HE of a homomorphic cryptosystem, to the platform. The private key, public key pair of this cryptosystem was previously generated by the client concerned. The private key, $sk_i$-HE, and the corresponding public key $pk_i$-HE thus generated are thus associated with this client. The public key $pk_i$-HE can possibly be transmitted to the platform by a key server.

In 412, the client $U_i$ transmits its symmetric key $sk_i^U$ encrypted by the public key $pk_i$-HE, to the platform.

It will be noted that the order of steps 410-412 is unimportant in this case.

In 415, the computer platform transmits the public key $pk_i$-HE to the supplier $F_j$ (or even to all suppliers). This public key can possibly be transmitted directly by the client himself, or even transmitted by a key server.

Steps 420-421 are steps in which the supplier $F_j$ sends data to computer platform.

Thus, in 420, the supplier $F_j$ transmits the parameters $p_j$ of its model to the computer platform, in encrypted form, namely $$[p_j]_{sk_j^F}.$$

In 421, the supplier $F_j$, who has previously received the homomorphic public key $pk_i$-HE in 415, encrypts its own symmetric key using the homomorphic public key and sends the encrypted result, $$[sk_j^F]_{pk_i-HE},$$

to the platform.

It will be noted that step 420 can be performed at any position in the previous sequence, only step 421 needs to take place after step 415.

In a first transcryption step, 430, the computer platform once again encrypts the encrypted data $$[x_i]_{sk_i^U},$$

using the public key, $pk_i$-HE then decrypts these data thus reencrypted in the homomorphic domain, namely $$[x_i]_{pk_i-HE} = dec\left( \left[[x_i]_{sk_i^U}\right]_{pk_i-HE}, [sk_i^U]_{pk_i-HE} \right).$$

In a second transcryption step, 440, the computer platform once again encrypts the encrypted parameters $$[p_j]_{sk_j^F},$$

using the public key, $pk_i$-HE then decrypts these parameters thus reencrypted, namely $$\left[[p_j]_{sk_j^F}\right]_{pk_i-HE},$$

in the homomorphic domain:

$$[p_j]_{pk_i-HE} = dec\left( \left[[p_j]_{sk_j^F}\right]_{pk_i-HE}, [sk_j^F]_{pk_i-HE} \right).$$

Once again, the order of steps 430 and 440 is indifferent. However, step 430 must be done after steps 410-412. Similarly, step 440 must be done after steps 420-421.

Then, in a data classification step, 450, the computer platform evaluates the classification function in the homomorphic domain, namely $$[r_{ij}]_{pk_i-HE} = f([x_i]_{pk_i-HE}, [p_j]_{pk_i-HE}).$$

Finally, in 460, the computer platform sends the classification result to the client $U_i$ (encrypted by the public key $pk_i$-HE), $$[r_{ij}]_{pk_i-HE}.$$

In 470, the client $U_i$, having the corresponding private key $sk_i$-HE, decrypts the encrypted classification result $$[r_{ij}]_{pk_i-HE}$$

to obtain the classification result in plaintext, $r_{ij}$.

It will be noted that the classification result $$[r_{ij}]_{pk_i-HE}$$

can thus not be decrypted by other clients.

Figure 5:
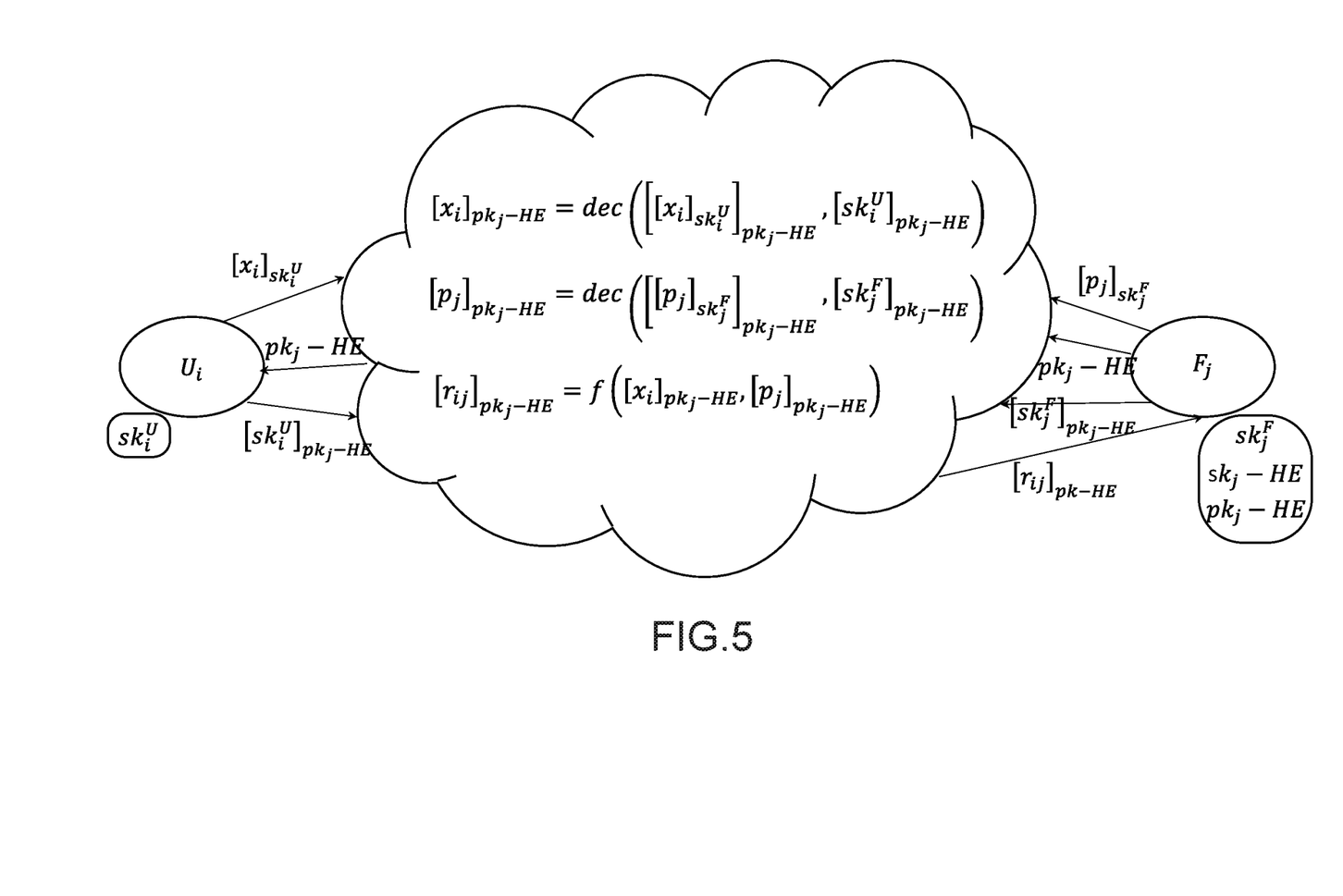
FIG. 5 diagrammatically represents a secure classification method according to a second embodiment of the invention.

FIG. 5 diagrammatically represents a secure classification method according to a second embodiment of the invention.

In this embodiment, the result of the classification is decrypted by the supplier who supplied the classification model.

To achieve this, the supplier sends its homomorphic public key to the platform and decrypts the result of the classification with its corresponding private key.

As in the previous embodiment, only the client $U_i$ and the model supplier $F_j$ concerned are represented on the figure. However it is clear that other clients and other suppliers can connect to the platform.

The notations $sk_j$-HE and $pk_j$-HE are used to denote a private key and a public key respectively of a homomorphic cryptosystem. For example, this pair of keys can be generated locally by the supplier $F_j$. The supplier may also have obtained a public key certificate from a certification authority.

Furthermore, as before the client $U_i$ has a first symmetric key $sk_i^U$ and the supplier has a second symmetric key $sk_j^F$, for stream cipher encryption.

The supplier $F_j$ transmits the public key $pk_j$-HE, model parameters encrypted by the second symmetric key, namely $$[p_j]_{sk_j^F},$$

and the second symmetric key encrypted by the public key, namely $$[sk_j^F]_{pk_j\text{-}HE},$$

to the computer platform prior to the first transcription step.

In parallel, the platform receives data to be classified encrypted by the first symmetric key, namely $$[x_i]_{sk_i^U},$$

from the client $U_i$.

The platform transmits the public key $pk_j$-HE previously received from the supplier $F_j$ to the client $U_i$. The client then returns the first symmetric key encrypted by the public key, namely $$[sk_i^U]_{pk_j\text{-}HE},$$

to the platform.

In a first transcryption step, the computer platform once again encrypts the previously encrypted data $$[x_i]_{sk_i^U},$$

using the public key $pk_j$-HE that it received from $F_j$, and then performs the decryption operation of these reencrypted data in the homomorphic domain by means of the first symmetric key encrypted by the public key, namely $$[sk_i^U]_{pk_j\text{-}HE},$$

that it had previously received from $U_i$:

$$[x_i]_{pk_j\text{-}HE} = dec\left([[x_i]_{sk_i^U}]_{pk_j\text{-}HE}, [sk_i^U]_{pk_j\text{-}HE}\right) \quad (11)$$

In the second transcryption step, the computer platform once again encrypts the encrypted parameters $$[p_j]_{sk_j^F},$$

using the public key $pk_j$-HE that it received from $F_j$, and then performs the decryption operation of these reencrypted data, namely $$\left[[p_j]_{sk_j^F}\right]_{pk_j\text{-}HE},$$

in the homomorphic domain by means of the second symmetric key encrypted by the public key, $$[sk_j^F]_{pk_j\text{-}HE},$$

that it previously received from $F_j$:

$$[p_j]_{pk_j\text{-}HE} = dec\left([[p_j]_{sk_j^F}]_{pk_j\text{-}HE}, [sk_j^F]_{pk_j\text{-}HE}\right) \quad (12)$$

In the classification step, the platform evaluates the classification function as before, in other words:

$$[r_{ij}]_{pk_j\text{-}HE} = f([x_i]_{pk_j\text{-}HE}, [p_j]_{pk_j\text{-}HE}) \quad (13)$$

This classification result is then sent to the supplier who can decrypt the result using his private key $sk_j$-HE.

According to one variant, the pair of private and public keys of the homomorphic cryptosystem is generated locally by the supplier $F_j$, but the public key is distributed by a key server, different from $F_j$, to the platform and to the client $U_i$, or even to all clients $U_i$, $i=1, \ldots, N$.

This second embodiment can be illustrated by a usage case in which the manager of an eco-district (supplier) would like to know the energy consumption profiles of residences (clients) that he manages. The different residences send data about their energy consumption to the platform, in a secure manner. After the secure classification, the manager obtains the energy classes of his clients without being able to access their data in plaintext.

Figure 6:
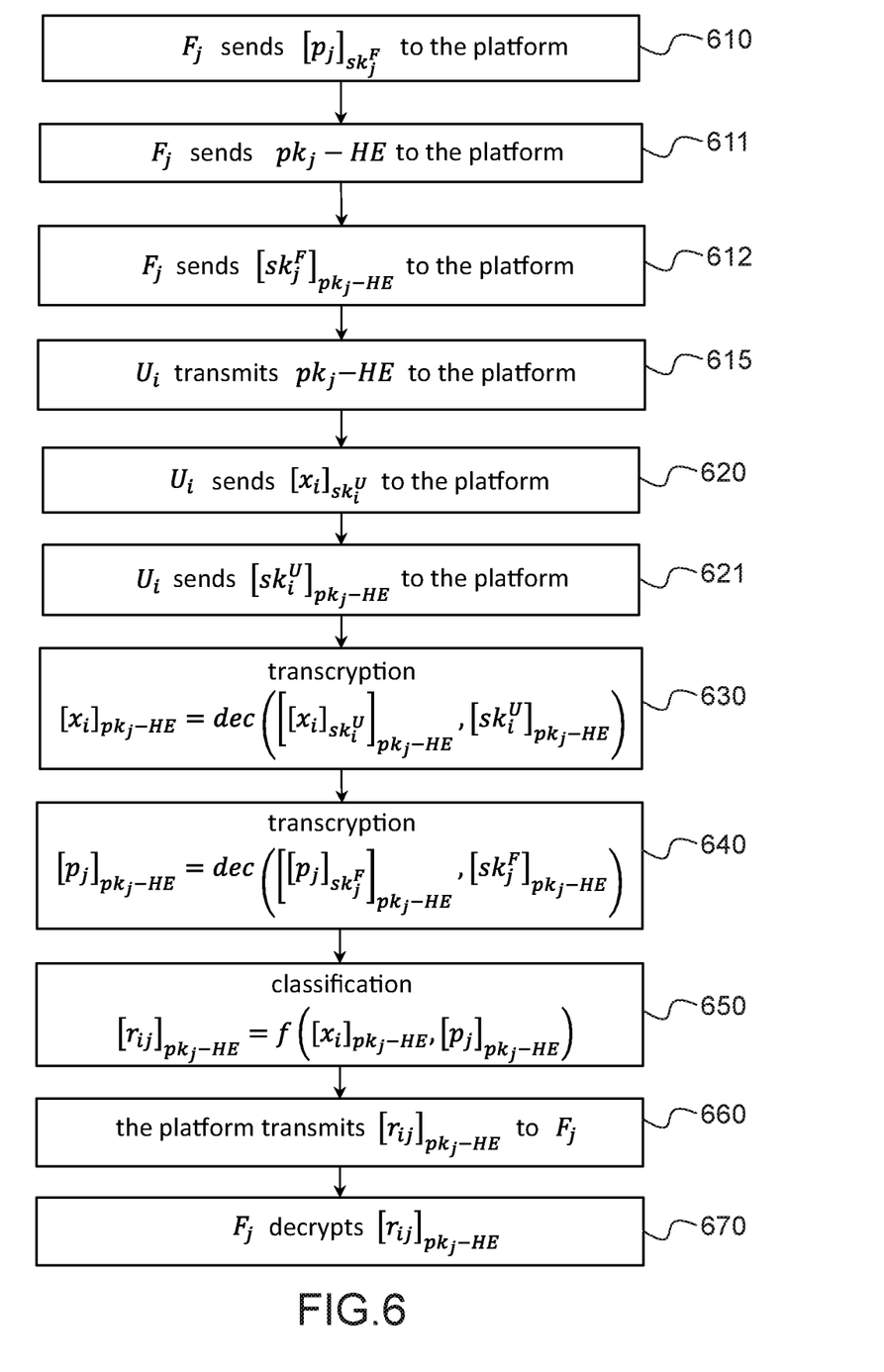
FIG. 6 represents a flow chart of the secure classification method shown in FIG. 5.

FIG. 6 represents a flow chart of the secure classification method shown in FIG. 5.

This method includes firstly the first send steps 610, 611, 612 from the supplier to the computer platform.

More precisely, in 610, the supplier $F_j$ transmits the parameters $p_j$ of its model to the computer platform, in encrypted form, namely $$[p_j]_{sk_j^F}.$$

In 611, the supplier $F_j$ transmits the public key of a homomorphic cryptosystem, to the platform. The private key, public key pair of this cryptosystem was previously generated by the supplier. The private key, $sk_j$-HE, and the corresponding public key $pk_j$-HE thus generated are associated with this supplier. The public key $pk_j$-HE can possibly be transmitted to the platform by a key server.

In 612, the supplier $F_j$ transmits its symmetric key $sk_j^F$ encrypted by the public key $pk_j$-HE, to the platform.

It will be noted that the order of steps 610-612 is unimportant.

In 615, the computer platform sends the public key $pk_j$-HE to the client $U_i$ (or even to all clients). This public key can possibly be transmitted directly by the supplier himself, or even transmitted by a key server.

Steps 620-621 are steps in which the client $U_i$ sends data to the computer platform.

Thus, in 620, the client $U_i$ transmits the data to be classified to the computer platform, in encrypted form, namely $$[x_i]_{sk_i^U}.$$

In 621, the client $U_i$, who has previously received the homomorphic public key $pk_j$-HE in 615, encrypts its symmetric key using this homomorphic public key and transmits the encrypted result, $$[sk_i^U]_{pk_j-HE},$$

to the platform.

It will be noted that step 620 can be performed at any position in the previous sequence, only step 621 needs to take place after step 615.

In a first transcryption step, 630, the computer platform once again encrypts the encrypted data $$[x_i]_{sk_i^U},$$

using the public key, $pk_j$-HE then decrypts these data thus reencrypted in the homomorphic domain, namely $$[x_i]_{pk_j-HE} = dec\left(\left[[x_i]_{sk_i^U}\right]_{pk_j-HE}, [sk_i^U]_{pk_j-HE}\right).$$

In a second transcryption step, 640, the computer platform once again encrypts the encrypted parameters $$[p_j]_{sk_j^F},$$

using the public key, $pk_j$-HE then decrypts these parameters thus reencrypted, namely $$\left[[p_j]_{sk_j^F}\right]_{pk_j-HE},$$

in the homomorphic domain, namely $$[p_j]_{pk_j-HE} = dec\left(\left[[p_j]_{sk_j^F}\right]_{pk_j-HE}, [sk_j^F]_{pk_j-HE}\right).$$

Once again, the order of steps 630 and 640 is indifferent. However, step 640 must be done after steps 610-612. Similarly, step 630 must be done after steps 620-621.

Then, in a data classification step, 650, the computer platform evaluates the classification function in the homomorphic domain, namely $$[r_{ij}]_{pk_j-HE} = f([x_i]_{pk_j-HE}, [p_j]_{pk_j-HE}).$$

Finally, in 660, the computer platform transmits the classification result to the supplier $F_j$ (encrypted by the public key $pk_j$-HE), $$[r_{ij}]_{pk_j-HE}.$$

In 670, the supplier $F_j$, having the corresponding private key $sk_j$-HE, decrypts the encrypted classification result $$[r_{ij}]_{pk_j-HE}$$

to obtain the classification result in plaintext, $r_{ij}$.

It will be noted that the classification result $$[r_{ij}]_{pk_j-HE}$$

cannot in particular be decrypted by other suppliers.

In the above, it has been assumed that suppliers would send parameters of their classification models to the platform. Alternatively, it could be envisaged that suppliers send learning data, the classification model then being constructed by the platform in the homomorphic domain.

The invention claimed is:

1. A method for secure data classification by processing circuitry of a computer platform, comprising:
   receiving data to be classified from a client, the data being in encrypted form, having been encrypted using a stream cipher method using a first symmetric key associated with the client;
   receiving, from the client, an encrypted version of the first symmetric key encrypted by the client using a public key of a homomorphic cryptosystem;
   receiving, before performing the data classification, parameters of a classification model from at least one supplier, the parameters being in encrypted form, having been encrypted using a stream cipher method using a second symmetric key associated with the supplier;
   re-encrypting, using the public key of a homomorphic cryptosystem after receiving the encrypted version of the first symmetric key, the received data already encrypted by the first symmetric key, and decrypting the data thus re-encrypted in the homomorphic domain by using the encrypted form of the first symmetric key encrypted by the public key of the homomorphic cryptosystem, to obtain the data encrypted by the public key;
   re-encrypting, using the public key of the homomorphic cryptosystem, the received parameters already encrypted by the second symmetric key, and decrypting the parameters thus re-encrypted in the homomorphic domain by using an encrypted form of the second symmetric key encrypted by the public key of the homomorphic cryptosystem, to obtain the parameters encrypted by the public key; and
   classifying using a classification function, the classification function operating on the data and the parameters encrypted by the public key, the classification function being evaluated in the homomorphic domain, to obtain a classification result encrypted by the public key.

2. The secure classification method according to claim 1, wherein, prior to re-encrypting the received data, the public key is transmitted by the client to the computer platform, and the method further includes transmitting the classification result encrypted by the public key to the client, the client decrypting the result using the private key of the homomorphic cryptosystem to obtain a plaintext classification result.

3. The secure classification method according to claim 2, further comprising transmitting the public key to the supplier, prior to re-encrypting the received parameter, the second symmetric key is encrypted by the supplier using the public key, and receiving the thus encrypted second symmetric key from the client, and wherein the step of decrypting the reencrypted parameters comprises decrypting the re-encrypted parameters in the homomorphic domain using the second symmetric key encrypted by the public key.

4. The secure classification method according to claim 1, wherein, prior to re-encrypting the received data, receiving the public key from the supplier, and transmitting the classification result encrypted by the public key to the supplier, the supplier decrypting the result using the private key of the homomorphic cryptosystem to obtain a plaintext classification result.

5. The secure classification method according to claim 4, further comprising transmitting the public key to the client, prior to re-encrypting the received data, the first symmetric key is encrypted by the client using the public key, and receiving the thus encrypted first symmetric key from the client, and wherein the step of decrypting the re-encrypted data comprises decrypting the re-encrypted data in the homomorphic domain using the first symmetric key encrypted by the public key.

6. The secure classification method according to claim 1, wherein the classification function is a linear function of the data to be classified.

7. The secure classification method according to claim 1, wherein the classification function is a polynomial function of the data to be classified.

8. The secure classification method according to claim 1, wherein, prior to re-encrypting the received data, receiving the public key from the client, and transmitting the classification result encrypted by the public key to the client, the client decrypting the result using the private key of the homomorphic cryptosystem to obtain a plaintext classification result.

9. The secure classification method according to claim 1, wherein, prior to re-encrypting the received data, receiving the public key from the supplier, and transmitting the classification result encrypted by the public key to the supplier, the supplier decrypting the result using the private key of the homomorphic cryptosystem to obtain a plaintext classification result.

10. An apparatus for secure data classification, comprising:

processing circuitry configured to receive data to be classified from a client, the data being in encrypted form, having been encrypted using a stream cipher method using a first symmetric key associated with the client;

receive, from the client, an encrypted version of the first symmetric key encrypted by the client using a public key of a homomorphic cryptosystem;

receive, before performing the data classification, parameters of a classification model from at least one supplier, the parameters being in encrypted form, having been encrypted using a stream cipher method using a second symmetric key associated with the supplier;

re-encrypt, using the public key of a homomorphic cryptosystem after receiving the encrypted version of the first symmetric key, the received data already encrypted by the first symmetric key, and decrypt the data thus re-encrypted in the homomorphic domain by using the encrypted form of the first symmetric key encrypted by the public key of the homomorphic cryptosystem, to obtain the data encrypted by the public key;

re-encrypt, using the public key of the homomorphic cryptosystem, the received parameters already encrypted by the second symmetric key, and decrypt the parameters thus re-encrypted in the homomorphic domain by using an encrypted form of the second symmetric key encrypted by the public key of the homomorphic cryptosystem, to obtain the parameters encrypted by the public key; and classify, using a classification function, the classification function operating on the data and the parameters encrypted by the public key, the classification function being evaluated in the homomorphic domain, to obtain a classification result encrypted by the public key.

* * * * *